United States Patent
Danielsson

(10) Patent No.: US 7,212,605 B2
(45) Date of Patent: May 1, 2007

(54) DEVICE AND METHOD RELATED TO X-RAY IMAGING

(75) Inventor: Mats Danielsson, Täby (SE)

(73) Assignee: Sectra Mamea AB, Taby (SE)

( * ) Notice: Subject to any disclaimer, the term of this patent is extended or adjusted under 35 U.S.C. 154(b) by 0 days.

(21) Appl. No.: 09/682,540

(22) Filed: Sep. 17, 2001

(65) Prior Publication Data

US 2002/0018543 A1 Feb. 14, 2002

Related U.S. Application Data

(63) Continuation of application No. PCT/SE00/00524, filed on Mar. 15, 2000.

(60) Provisional application No. 60/157,333, filed on Oct. 1, 1999.

(30) Foreign Application Priority Data

Mar. 15, 1999 (SE) .................................. 9900922
Oct. 1, 1999 (SE) .................................. 9903559

(51) Int. Cl.
*A61B 6/04* (2006.01)

(52) U.S. Cl. ......................................... 378/37; 378/146

(58) Field of Classification Search ............... 378/98.8, 378/98.2, 196–197, 62, 146, 37, 181, 26; 250/370.09, 370.11, 385.1, 363.2; 258/10
See application file for complete search history.

(56) References Cited

U.S. PATENT DOCUMENTS

| | | | | |
|---|---|---|---|---|
| 4,694,399 A | * | 9/1987 | Tan et al. | 378/11 |
| 4,873,708 A | * | 10/1989 | Cusano et al. | 378/19 |
| 4,937,453 A | | 6/1990 | Nelson | |
| 4,953,189 A | * | 8/1990 | Wang | 378/108 |
| 5,396,072 A | * | 3/1995 | Schiebel et al. | 250/370.09 |
| 5,461,653 A | | 10/1995 | Parker | |
| 5,834,782 A | * | 11/1998 | Schick et al. | 250/370.11 |

* cited by examiner

*Primary Examiner*—Edward J. Glick
*Assistant Examiner*—Hoon Song
(74) *Attorney, Agent, or Firm*—Novak Druce & Quigg LLP

(57) ABSTRACT

The present invention relates to an arrangement for detecting X-ray radiations comprising a carrying member on one face arranged with detectors consisting of a plurality of sensors arranged on a substrate. The detectors are arranged substantially edge to edge at lease in one row on at least one side of said carrying member.

18 Claims, 6 Drawing Sheets

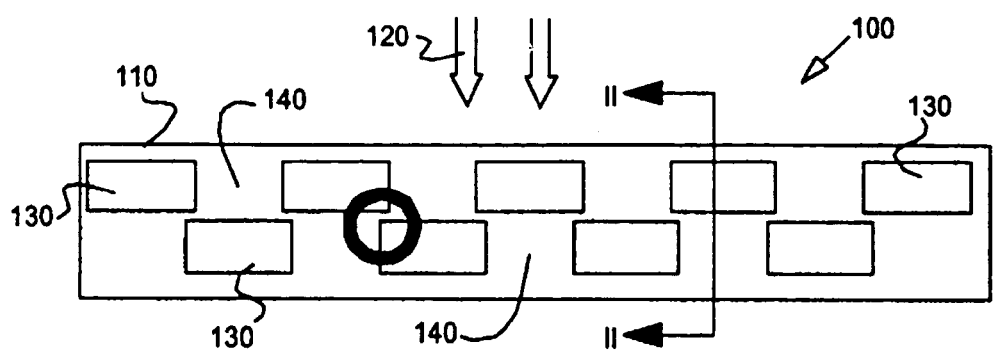

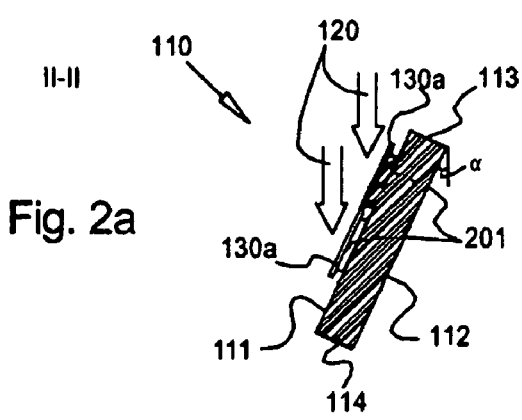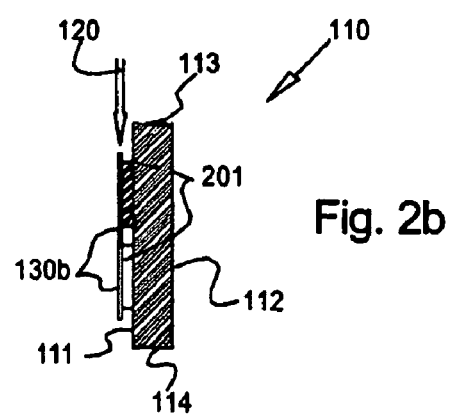

DEVICE AND METHOD RELATED TO X-RAY IMAGING

CROSS REFERENCE TO RELATED APPLICATIONS

The present application is a continuation of International Application No. PCT/SE00/00524, filed Mar. 15, 2000, which claims priority to Swedish Application No. 9900922-7, filed Mar. 15, 1999, U.S. Provisional Application No. 60/157,333, filed Oct. 1, 1999, and Swedish Application No. 9903559-4, filed Oct. 1, 1999.

BACKGROUND OF INVENTION

1. Technical Field

The present invention relates to an arrangement for detecting X-ray radiations comprising a carrying member on one face arranged with detectors consisting of a plurality of sensors provided on a substrate. The invention also relates to an X-ray apparatus using such an arrangement and a method of scanning in an X-ray apparatus including such an arrangement.

2. Background Information

Typical X-ray imaging systems consist of an X-ray source in front of the object and an area detector behind the object for registering the image. However, this setup is sensitive to background noise in the form of Compton scattered radiation. Existing methods to remove this background noise are inefficient, and also tend to remove part of the primary X-rays containing the image information. This results in requiring a dose increase that may be as high as a factor of three (3).

One solution to this problem is a scanned-slot setup. With this solution, a pre-collimator slot before the object shapes the X-ray beam so that it matches the active detector area. The slot is mechanically moved in order to image the whole object. It is also possible to move or have the object move with respect to the slot. However, this can be inconvenient as the object is usually heavier than the mechanics for the slot. Still, the solution is advantageous since only a narrow fan-beam crosses the object at any single time, thereby minimizing the amount of Compton scattered X-rays. Another advantage with the scanned-slot approach is that the required detector area is much smaller. This reduces cost, and also enables the use of more expensive and efficient detector materials if desired.

A drawback with the scanned-slot geometry is that only a small fraction of the X-rays from the source is actually used to form the image. As a result, the time for image acquisition is extended, requiring the X-ray tube to be turned on for a longer period of time. A way of mitigating this problem and achieving a practical system is to use a multi-slot collimator with different detector arrays under each slot. However, this makes image acquisition difficult since information from the different detectors has to be combined together into one image without any visible artifacts, such as border lines between areas where different detectors are used.

U.S. Pat. No. 5,461,653 to Parker describes a filmless X-ray imaging system having at least one X-ray source, upper and lower collimators, and a solid-state detector array that can provide three-dimensional imaging capability. The X-ray source plane is distance z1 above the upper collimator plane, distance z2 above the lower collimator plane, and distance z3 above the plane of the detector array. The object to be X-rayed is located between the upper and lower collimator planes. The upper and lower collimators and detector array are moved horizontally with scanning velocities v1, v2, and v3, proportional to distances z1, z2 and z3, respectively. The pattern and size of openings in the collimators between detector positions is proportional such that similar triangles are always defined relative to the location of the X-ray source. X-rays that pass through openings in the upper collimator will always pass through corresponding and similar openings in the lower collimator, and then to a corresponding detector in the underlying detector array. Substantially all of the X-rays irradiating the object (and neither absorbed nor scattered) pass through the lower collimator openings and are detected, promoting enhanced sensitivity. A computer system coordinates repositioning of the collimators and detector array and X-ray source locations. The computer system can store detector array output and can associate a known X-ray source location with detector array output data, thereby providing three-dimensional imaging. Detector output may be viewed instantly, stored digitally, and/or transmitted electronically for image viewing at a remote site.

A method and apparatus for detecting X-ray radiation in a radiographic imaging context using "edge-on" detectors is disclosed in U.S. Pat. No. 4,937,453 to Nelson ("Nelson"). It is particularly useful in conjunction with slit and slot scan radiography. In accordance with this invention, detectors are constructed and arranged such that substantially all of the energy detected from an X-ray is discharged in the detector. In this way, a detector is provided that provides a direct electronic read out, high X-ray stopping power and high spatial resolution, while obtaining good signal collection efficiency without the use of excessively high voltage levels. In the preferred embodiment, solid state X-ray detectors are constructed such that the thickness of the detector along the direction of incident X-rays is long enough so that substantially all of the X-ray energy is discharged in the detector.

Pending Swedish Patent Application No. 9900856-7 ("the '856 application") refers to a method of obtaining improved radiographic images consisting of orienting a semiconductor radiation detector. The orienting step comprises selecting an acute angle between the direction of incident radiation and a side of the detector so that the incident radiation mainly hits the side.

SUMMARY OF INVENTION

The present invention overcomes those problems stated above and presents a method for solving the problem of acquiring a high quality image without artifacts using a single or multi-slot detector system.

The present invention furthers provides a detector arrangement that simplifies image scanning and acquisition in an X-ray imaging system.

A particular advantage of the present invention is the robustness of the system with respect to non-functioning, dead channels and the low sensitivity to deterioration of spatial resolution due to motion in the object.

The detectors of the present invention are arranged substantially edge to edge in at least one row and on at least one side of a carrying member. Moreover, the detectors are preferably arranged side by side. In one preferred embodiment, at least two detectors are arranged in at least two levels and displaced relative each other such that an active area of one electrode or detector overlaps the inactive section on the other detector.

In one embodiment, the detector has a sensor plane. This sensor plane is arranged at an angle incident to X-ray beams. In an alternative embodiment, the detector has a sensor plane that is arranged parallel to incident X-ray beams. Preferably, the carrying member is tilted to arrange the sensor plane in the angle. Additionally, the detectors may be arranged on a supporting member.

The detectors may be comprised of a scintillator optically connected to a CCD, silicon diodes, or a gaseous detector such as a parallel plate chamber where the gas volume is oriented edge-on to the incident X-rays.

An X-ray apparatus according to the invention comprises an essentially planar member of a material that is non-transparent to X-rays and has an elongated slot formed therein. The apparatus further comprises an array of detectors in communication with the slots, arranged to detect X-rays, which provide a signal representing the intensity of the X-rays impinging thereon. The arrangement also comprises a means for moving the substantially beam directing member, and an object to be examined relative to each other. The array of detectors comprises detector arrangements arranged substantially in parallel and having one or more carrying members, each arranged on at least one face, with the detectors comprising a plurality of sensors provided on a substrate. The detectors are arranged substantially edge to edge at least in one row and on at least one side of the carrying member. The detectors may also be arranged side by side.

In one preferred embodiment, at least two detectors are arranged in at least two levels and displaced relative each other such that an active section on one electrode or detector overlaps an inactive area of the other electrode. Preferably, the apparatus further includes a means for acquiring data from the detector arrays at intervals corresponding to a fraction of the width of the sensor arrays. The sensors on the detector arrays are preferably made of silicon wafers oriented substantially edge-on to the incident X-rays. Each detector has a sensor plane arranged at an angle incident to X-ray beams or in parallel to incident X-ray beams.

Preferably, the substantially beam directing member is arranged with slots in at least two rows, with slots in each row displaced relative each other. Alternatively, the substantially beam directing member is a refracting or focusing member.

According a preferred method in accordance with the present invention, the method for scanning in an X-ray apparatus comprises the steps of arranging a first part of collimators before start of the scanning in a field of view while the second part of the collimators are outside the field of view, starting the scan from a first position, the collimators and detectors having a first speed, bringing the collimators and detectors to a maximum, substantially constant speed when all collimators and detectors are in the field of view, and, when the first collimator is outside the field of view, bringing the collimators and detectors to a third speed.

The method further comprises the step of stopping the scan when the second part of the collimators are outside the held of view.

According to this method, an acceleration time before the scan reaches a maximum speed and a deceleration time before it stops is determined in such a way that the parts of an image where the acceleration and retardation takes place obtains substantially the same photon statistics as the rest of the image.

According to an alternative method, the following steps are performed. A scan is started. When the scan starts, the slots and corresponding detectors are provided substantially outside a field of view. Substantially all slots and corresponding detectors, the object and, thus, the field of view are passed. Scan X-ray fluxes, together with position coordinates for all detectors, are measured. The scan is terminated only after all slots and corresponding detectors are substantially outside the field of view. The method further comprises the step of incrementing the scanning at least a distance corresponding to a fraction of a distance of the detectors arrangements. Preferably, the scan is continuous, with readout of data performed at intervals corresponding to a fraction of a distance between the detector arrangements.

Moreover, the read-out data for each increment and for each sensor array is stored as data arrays, with the stored data for each sensor array separately combined to form an image, and with images obtained by each sensor array superposed to form a final image.

BRIEF DESCRIPTION OF DRAWINGS

In the following, the invention will be further described in a non-limiting way with reference to the accompanying drawings in which:

FIG. 1 is a schematic frontal view of a detector assembly according to the invention;

FIGS. 2a and 2b are cross-sections along line II—II in FIG. 1, showing two alternative embodiments;

DETAILED DESCRIPTION

Figure 3A:
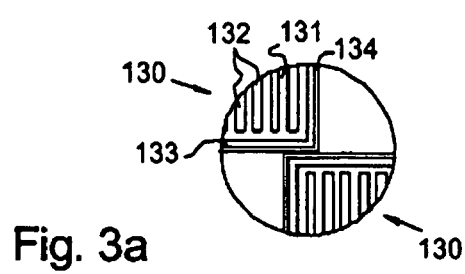
FIGS. 3a and 3b are enlargements of the encircled area in FIG. 1, showing two alternative embodiments.

A preferred embodiment of the an detector arrangement 100 for detecting X-ray radiations 120 is illustrated in FIGS. 1, 2a and 2b. The detector arrangement 100 comprises a carrying member 110, on which a number of detectors 130, as described in the '856 application (incorporated herein throughout by reference) or the '453 patent, are arranged.

The carrying member 110 can be a substantially rectangular piece made of suitable material. The carrying member 110 can be a standard printed circuit board available from a multitude of manufacturers, or it can be a ceramic of similar type as used to carry the chips in multi-chip modules. Its important that the carrying member is mechanically stable, and that any expansion with temperature is similar in magnitude to the expansion of the detectors, e.g. , silicon chips, attached to its surface. The carrying member has a first side 111 and a second side 112, and a first end 113 and a second end 114. The first side is arranged with supporting members 201 for supporting edge-on arranged detectors 130a and 130b. The detectors 130 are arranged so that they are spaced apart in two rows in the transverse direction of the carrying member. A space 140 is provided corresponding substantially to the length of a detector 130. The detectors 130 in each row are displaced relative each other such that a space 140 in a row corresponds to a detector 130 in the other row. The space between the detector edges at each row, i.e., the space between the bottom edge of an upper detector and top edge of the lower detector, is so provided that a substantially continuous detector surface is provided.

Detectors 130a in FIG. 2a refer to detectors according to the '856 application, and detectors 130b in FIG. 2b refer to detectors according to Nelson. In FIG. 2a, the detectors 130a are tilted at an acute angle a by tilting the carrying member 110, whereby radiation 120 inside onto a surface of the detectors incorporating sensors in the acute angle a. The detectors 130a may also be tilted by tilting the supporting members 201 or using biased detector substrates. The supporting members 201 may also be comprised of an adhesive agent for adhering the detectors 130a onto the carrying member 110. Although, rectangular shaped detectors are illustrated, it is obvious that detectors having other shapes can also be engaged.

In the embodiment according to FIG. 2b, the detectors 130b are arranged in parallel to the incident X-rays 120, whereby the rays hit the top edges of the detectors 130b as described in Patent '453. The reason for displacement of the detectors 130b relative each other in each row is that the edges of each detector 130b is provided with a dead zone and a guard ring. The encircled corner sections of two detectors 130 are enlarged in FIGS. 3a and 3b. Each detector 130 comprises semiconductive substrate 131 on which a number of strips of pixel sensors 132 are arranged on a front side of the detector. The edge of the detector comprises a guard ring 133 and a dead area is 134. The dead 134 area corresponds approximately to the distance from the edge of the detector to a point in-between the guard ring where the strips of the sensors 132 begin. Each pixel sensor 132 is connected to electronics of an X-ray imaging apparatus through pads or contacts (not shown).

According to FIG. 3a, the detectors 130 are arranged with the active areas, i.e., the area within the guard rings 133, and, more specifically, between the guard rings 133 and the adjacent pixel sensors 132, substantially edge to edge. In the illustrated case, a pixel sensor 132 in a detector 130 of a first line is aligned to a guard ring section of a detector 130 in the second line. Consequently, when processing the signals from the detectors, the guard rings 133 and dead areas 134 will not effect the output.

Figure 3B:
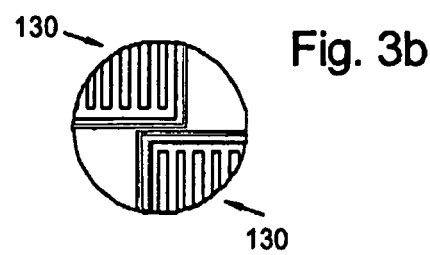

According to the embodiment of FIG. 3b, the active areas of each detector is 5 axially displaced so much that even the pixel sensors 132 overlap. The overlapping may approximately be about 20 to about 150 µm to allow for possible misalignments.

Figure 4A:
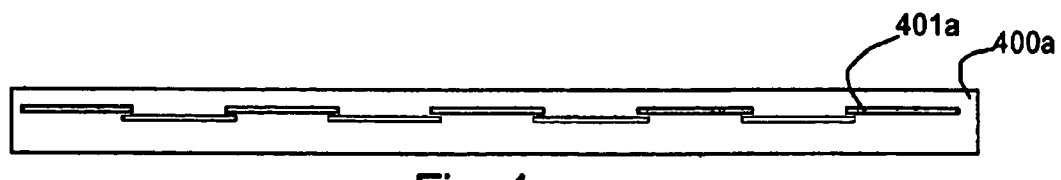
FIGS. 4a and 4b illustrate two alternative embodiments of a collimator.
Figure 4B:
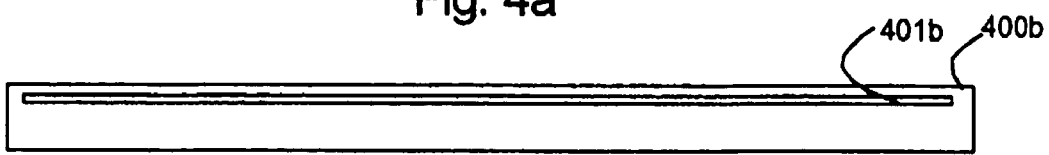

FIGS. 4a and 4b show top views of two collimators 400a and 400b. Collimators are used to shape the incident x-ray beam so as to match the detecting area on a detector. The collimator 400a corresponds to the detector arrangement according to the embodiment of FIG. 2a, and the collimator 400b corresponds to the detector arrangement according to the embodiment of FIG. 2b. The collimators comprises slots 401a and 401b, respectively. The slots 401a in FIG. 4a are arranged so that they are displaced relative each other corresponding to the configuration of the detectors in FIG. 2a. The slot 401b in FIG. 4b is an oblong slot substantially covering all of the detectors 130b.

Figure 6:
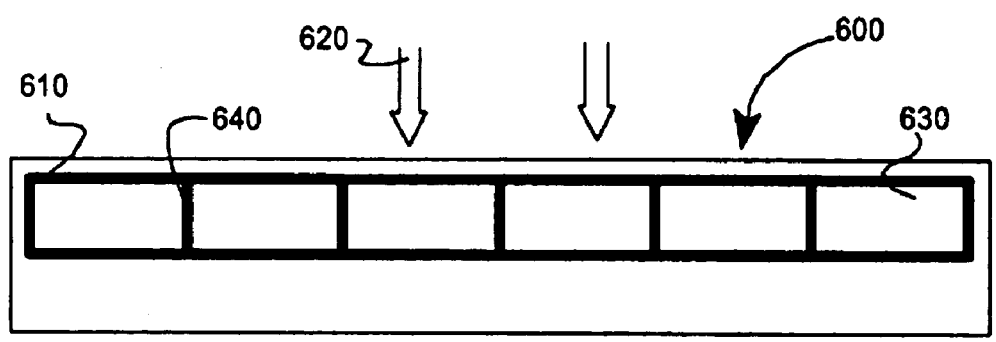
FIG. 6 shows a second embodiment of the detector assembly according to the invention in a schematic way.
Figure 7:
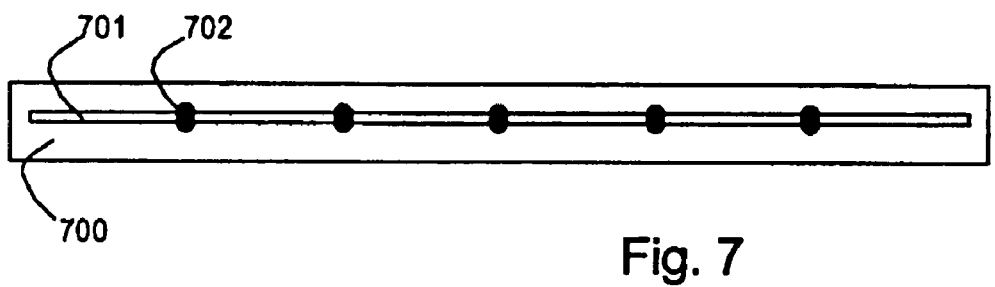
FIG. 7 is a schematic top view of a collimator corresponding to the embodiment of FIG. 6.

A good material for collimators is tungsten since it has a high stopping power and very small scattering probability for the X-rays. The collimators could also be made of other heavy metals such as copper, stainless steel, lead or the like. It is also possible to arrange the detectors 630 in one substantially straight row as shown in the detector arrangement 600 of FIG. 6. The detectors are arranged side by side and edge to edge and the only effective space 640 is provided by the dead area. The entire detector arrangement 600 can be tilted or arranged substantially perpendicular (to the plane of movement) according to the embodiments of FIGS. 2a and 2b. A corresponding collimator 700 is illustrated in FIG. 7. The slots 701 of the collimator are delimited from each other by means of walls 702 corresponding essentially to the "space" 640.

Figure 5:
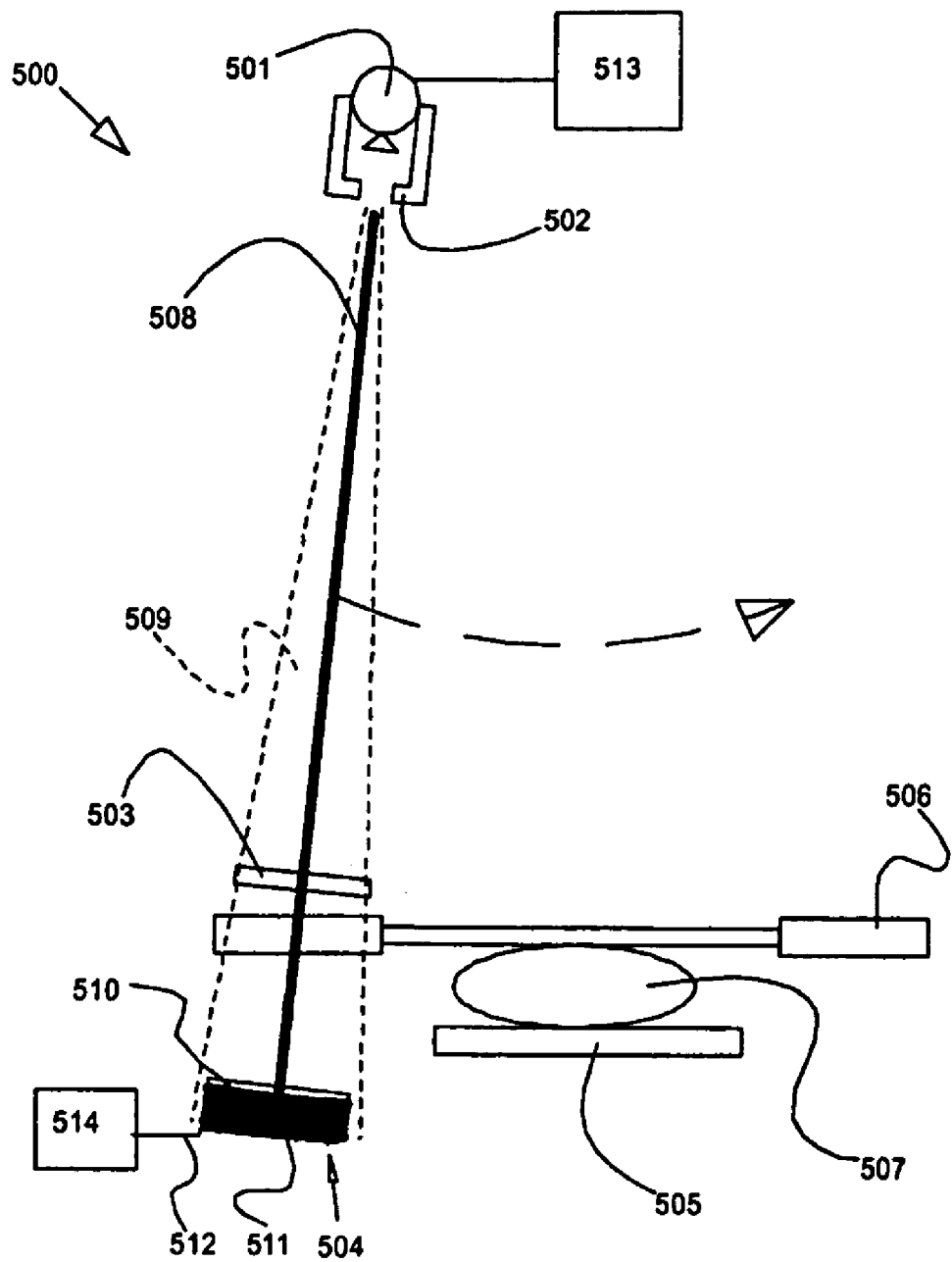
FIG. 5 shows a first embodiment of an x-ray imaging apparatus in a schematic way.

A preferred embodiment of an X-ray imaging apparatus 500, preferably but not exclusively for mammography is illustrated in FIG. 5. 501 denotes an X-ray source, 502 is a first rough collimator, 503 a second collimator, 504 is a sensor arrangement comprising a plurality of detector arrangements, 505 and 506 are lower upper holders, respectively, both transparent to x-rays; 507 is an object to be examined and 508 a support. The field of view between beams is denoted with 509 and also illustrated with dotted lines. The X-ray object 507 for mammography is a female breast that is compressed according to the standard technique using compression holders 505 and 506, the ends of the latter being arranged with x-ray blocking material. A third collimator 510 is also provided, the slots of which are matched to the collimator 503 above so that the X-rays coming straight from the source, without deflections, and pass collimator 503 will also pass collimator 510. After the third collimator 510, the sensor arrangement 504 comprising an array of detectors 511 is placed under each slot in such a way that all X-rays coming straight from the source without deflections that pass the second collimator 503 and pass the third collimator 510 will also hit the detector arrays beneath the slots and are registered by dedicated electronics. In this case detector arrangements according to FIG. 2a are used and arranged inparallel on a carrier with their longitudinal axis directed towards the plane of the drawing. The second and third collirnators 503 and 510 are placed on a mechanical support 508 together with the detector arrays 504. This support is connected to an accurate linear stage that can move the slots relative to the object. The scanning path is illustrated with dashed arrow. The stage is computer 513 controlled and equipped with an accurate position reading. While the slots are moving data from the detector arrays are read out, through connections 512 together with the present coordinate according to the position reading. From this information the image is reconstructed. Although the scanning path illustrated here is a reciprocating movement due to the circular symmetry of the radiation of the x-ray source, the radiation path can be arranged with refractive means to refract the beam into a plane parallel with the plane of the holders, whereby a linear movement of the collimators and detectors will be needed. Moreover, due to the circular radiation, the detectors are arranged in substantially circular carrier, which in case of a linear movement should be arranged in a flat carrier.

The field of view, i.e., the area where its possible to image an object with a scan, is defined by the ends of upper holder 506 that is equipped with blocking material. It is possible to attach a collimator to holder 506. However, it is not preferred to attach the collimator to the compression holder since they need to be light and easy to handle. The blocking material should be moved above the compression holder and rest on its own support.

The detector arrays and electronics could, for example, be comprised of a scintillator optically connected to a CCD. The sensor trays could also be made of silicon diodes, and a dedicated electronic circuit could count each X-ray. It would also be possible to use a gaseous detector, such as a parallel plate chamber where the gas volume is oriented edge-on to the incident X-rays and the pulses induced by the X-rays in the gas can be counted by a dedicated electronic circuit. To prevent scattered X-rays from one detector array reaching neighboring detector arrays an absorbing plate such as a thin copper plate can be inserted between each of the slots. The electronic circuit is connected to a computer unit 514 where the data is transferred for manipulation, corrections and display.

Obviously, one or more collimators can be substituted by a refractive or focusing means. A preferred scanning method according to the invention is performed as follows. Before the scanning start, at least a first part of the collimator 510, e.g., ⅔ of the total number of the collimators, are in the field of view while the second part, e.g., ⅓ of the collimators, are outside the field of view. The scan is started from a first position, e.g., at zero speed, and reaches a maximum substantially constant speed when all collimators and detectors are in the field of view. When the first collimator is outside the field of view, the scan is slowed down and stops when the second part of the collimators are outside the field of view. The acceleration time before the scan reaches the maximum speed and the deceleration time before the scan stops is determined in such a way that the parts of the image where the acceleration and retardation takes place obtains the same photon statistics as the rest of the image.

With this method, it might be technically more difficult to reconstruct the image from a practical point of view. However, experiments have shown that it is important not to have to much dead area in this direction since the detector, in the case of mammography, should go all the way up to the armpit of the patient. For example, if there is 1 mm between each line of detectors and 30 lines and assuming that ⅔ of the detectors are outside the field of view when starting the scan, the dead area will only extend about 10 mm.

According to another method, before the scan starts, all slots of the third collimator 510 are placed substantially outside the field of view. After the scan starts it should reach a constant speed before the first pair of slots formed in the second and third collimators 503, 510 enters the field of view. During the scan, the data containing information about the number of X-rays hitting the detector is read out as frequently as possible. The data for one read-out will consist of a vector of numbers representing the X-ray flux in each of the pixels of the sensor array. This vector is stored. When the scan is finished, the image resulting from one array of vectors consists of a matrix of all the vectors from the individual readouts.

If there is about 1 mm between each line of detectors and 30 lines, about 30 mm of dead area will be obtained according to this method.

To be more specific about the read out rate, the following example is given, assuming that the width of the sensors is 50 μm. In this case, the data is preferably read out at least every 25 μm corresponding to half the width of the array. This is sampling according to the Nyquist frequency, which prevents any large loss of information due to sampling in too large steps. It would also prevent artifacts due to abasing. It is also possible to sample more frequently than this. Sampling steps should not exceed 50 μm, i.e., the width of the array, since in this case the image for a certain array will be incomplete. Generally, readout data in time intervals more frequent than it takes for the slots to move a distance equal to half the size of the sensor arrays is preferred.

The scan should continue until substantially all slots have passed the field of view. There will now be enough information to create one image for the data coming from the sensor arrays for each of the slots. If there are N slots, N images are then obtained and the overall image is formed as the superposition of all images. This is a straightforward operation and only involves simple superposition of images and there is no need to seem several sub-images together. Dead individual sensors could simply be corrected for since information at this image point also exists in sensors at adjacent slots. The sensor arrays in the different slots could be slightly offset with respect to each other in order to avoid aliasing and sample according to the Nyquist criteria also in the dimension perpendicular to the scan direction.

The system will only be sensitive to motion in the object in a time frame defined by the time it takes the slots to move corresponding to the distance between the first and the last slot. This time Is usually considerably less than the total scan time.

The invention is not limited the shown embodiments but can be varied in a number of ways without departing from the scope of the appended claims and the arrangement and the method can be implemented in various ways depending on application, functional units, needs and requirements, etc. For example, a combination of arrangements could also be provided.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

The invention claimed is:

1. A method for scanning in an X-ray apparatus, said method comprising:
   providing an arrangement for detecting X-ray radiation, said arrangement comprising: an essentially planar member of a material non-transparent to X-rays and that has an elongated slot formed therein to provide a collimator for X-rays; a carrying member having detectors on a side thereof, said detectors including a plurality of sensors provided on a substrate; said detectors being arranged substantially edge-to-edge and side-by-side in at least one row on said side of said carrying member and said detectors comprising a sensor plane being substantially parallel to a surface of said carrying member and said carrying member being arranged so that said sensor plane is angularly oriented otherwise than perpendicular to incident X-ray beams, and wherein at least two detectors are arranged in at least two levels, said levels being displaced relative one to another such that an inactive section of at least one detector is overlapped with an active section of said other detector;
   starting a scan from a first position and said collimator and said detectors having a first speed;
   bringing said collimator and said detectors to a maximum, substantially constant speed when all of said collimator and said detectors are in the field of view; and
   bringing said collimator and said detectors to a third speed, wherein an acceleration time before said scan reaches a maximum speed and a deceleration time before said scan stops is determined in such a way that parts of an image, where the acceleration and deceleration take place, obtain substantially a same photon statistics as the rest of said image.

2. The method according to claim 1 wherein said sensor plane is arranged in parallel to incident X-ray beams.

3. The method according to claim 1 wherein said carrying member is tilted to arrange said sensor plane in said angle.

4. The method according to claim 1 wherein said detector is arranged on a supporting member.

5. The method according to claim 1 wherein said detectors comprise a scintillator optically connected to a device selected from the group consisting of a charge coupled device (CCD), silicon diodes, and a gaseous detector, such as a parallel plate chamber where the gas volume is oriented edge-on to the incident X-ray's.

6. The method according to claim 1 wherein said essentially planar member further comprises a plurality of slots arranged in at least two rows, and said slots in each row are displaced relative each other.

7. The method according to claim 1 further comprising a beam directing member constituting one of a refracting and focusing member.

8. The method according to claim 1 further comprising:
means for acquiring data from a plurality of detector arrays at intervals corresponding to a fraction of a width of said detector arrays.

9. The method according to claim 8 wherein sensors of said detector arrays are made of silicon wafers oriented substantially edge-on to incident X-rays.

10. An X-ray apparatus comprising:
an essentially planar member of a material non-transparent to X-rays and that has an elongated slot formed therein to provide a collimator for X-rays;
a carrying member having detectors on a side thereof, said detectors including a plurality of sensors provided on a substrate; and
said detectors being arranged substantially edge-to-edge and side-by-side in at least one row on said side of said carrying member and said detectors comprising a sensor plane being substantially parallel to a surface of said carrying member and said carrying member being arranged so that said sensor plane is angularly oriented otherwise than perpendicular to incident X-ray beams, and wherein at least two detectors are arranged in at least two levels, said levels being displaced relative one to another such that an inactive section of at least one detector is overlapped with an active section of said other detector, said collimator and said detectors adapted to perform a scan from a first position and a first speed; to a maximum, substantially constant speed when all of said collimator and said detectors are in the field of view, said collimator and said detectors having a third speed, wherein an acceleration time before said scan reaches said maximum speed and a deceleration time before said scan stops is determined in such a way that parts of an image, where the acceleration and deceleration take place, obtain substantially a same photon statistics as the rest of said image.

11. The apparatus according to claim 10 wherein said sensor plane is arranged in parallel to incident X-ray beams.

12. The apparatus according to claim 10 wherein said carrying member is tilted to arrange said sensor plane in said angle.

13. The apparatus according to claim 10 wherein said detector is arranged on a supporting member.

14. The apparatus according to claim 10 wherein said detectors comprise a scintillator optically connected to a device selected from the group consisting of a charge coupled device (CCD), silicon diodes, and a gaseous detector, such as a parallel plate chamber where the gas volume is oriented edge-on to the incident X-ray's.

15. The apparatus according to claim 10 wherein said essentially planar member further comprises a plurality of slots arranged in at least two rows, and said slots in each row are displaced relative each other.

16. The apparatus according to claim 10 further comprising a beam directing member constituting one of a refracting and focusing member.

17. The apparatus according to claim 10 further comprising:
means for acquiring data from a plurality of detector arrays at intervals corresponding to a fraction of a width of said detector arrays.

18. The apparatus according to claim 17 wherein sensors of said detector arrays are made of silicon wafers oriented substantially edge-on to incident X-rays.

* * * * *